UNITED STATES PATENT OFFICE.

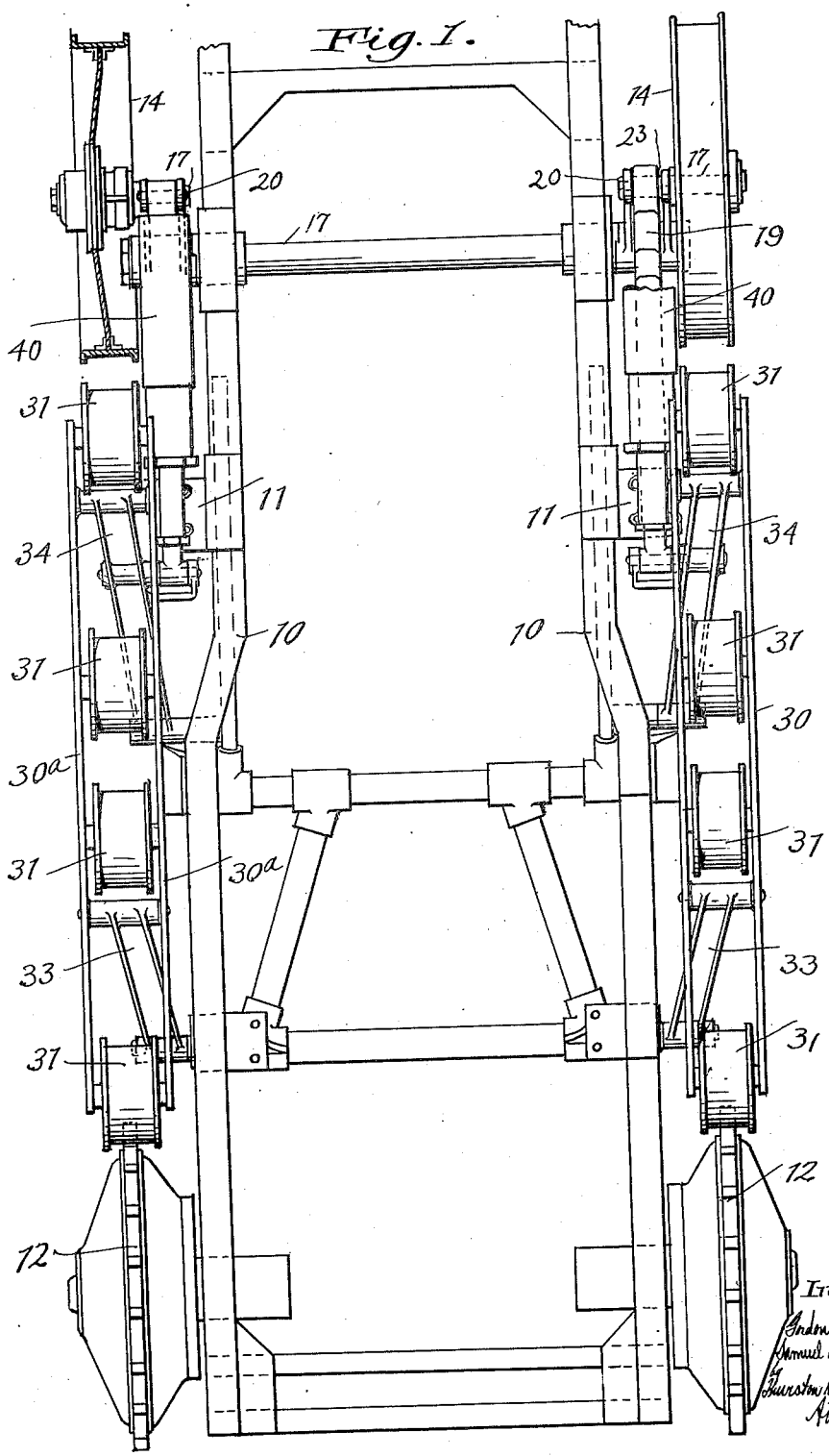

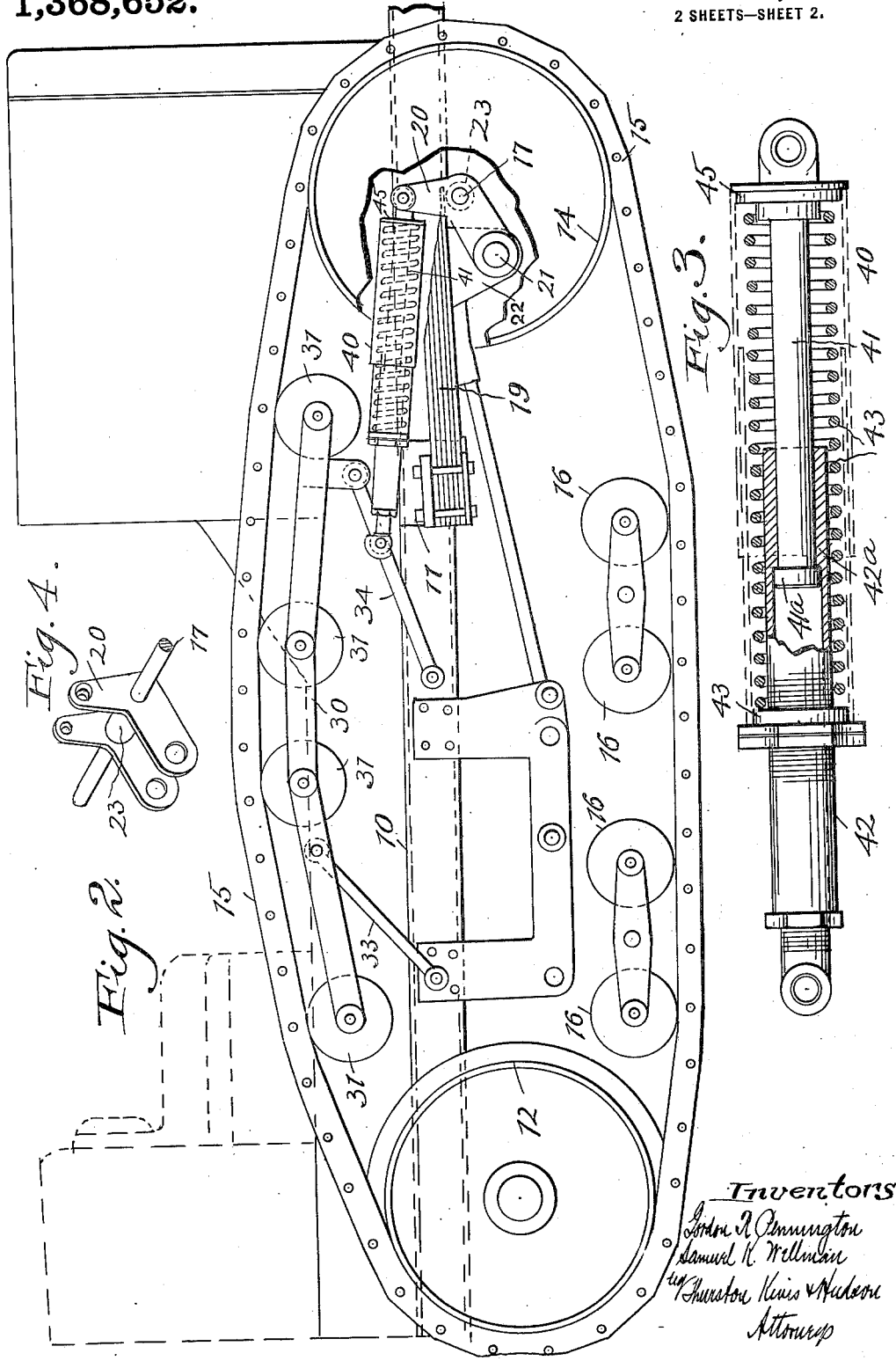

GORDON R. PENNINGTON, OF CLEVELAND, AND SAMUEL K. WELLMAN, OF CLEVELAND HEIGHTS, OHIO.

TRACK-BELT SUPPORTING AND TIGHTENING MECHANISM.

1,368,652.	Specification of Letters Patent.	Patented Feb. 15, 1921.

Application filed November 13, 1919. Serial No. 337,709.

*To all whom it may concern:*

Be it known that we, GORDON R. PENNINGTON and SAMUEL K. WELLMAN, citizens of the United States, and residents, respectively, of Cleveland, in the county of Cuyahoga and State of Ohio, and Cleveland Heights, in the county of Cuyahoga and State of Ohio, have invented a certain new and useful Improvement in Track-Belt Supporting and Tightening Mechanism, of which the following is a full, clear, and exact description.

The objects of this invention are to automatically maintain substantial uniformity in the tightness of the endless track belt of a track laying vehicle, and also to properly support the upper reach of said track belt, under the varying conditions which arise in use.

The invention consists in the construction and combination of parts shown in the drawing, hereinafter described and definitely pointed out in the appended claims.

In the drawings, Figure 1 is a plan view of so much of a track laying tractor having the invention applied to both sides thereof as is necessary to disclose the invention; Fig. 2 is a side elevation of the invention, and Fig. 3 is a longitudinal section of the link of automatically variable length, which link will be hereinafter described. Fig. 4 is a detached perspective view of the lever 20.

Referring to the parts by reference characters, 10—10 represent the two spaced apart side members of the rigid main frame of the vehicle. 12 represents the rear sprocket wheel which is rotatably supported upon the main frame, and may be the sprocket wheel by which the movement of the track belt is produced when the invention is applied to a produced tractor. 14 represents the front track wheel which is preferably a grooved idler wheel; and this is likewise rotatably supported upon the main frame, through means which will be explained. These two wheels respectively lie within the end loops of the endless track belt 15 which may be of any ordinary or suitable construction. 16 represents the load supporting track wheels which roll on the ground reach of the track belt. The drawing does not show any load supporting connections between these wheels and the main frame, because they have no relation to the present invention, and because any suitable connections may be employed, as for example, such as are disclosed in my copending application Serial No. 337,708, filed Nov. 13, 1919.

The parts referred to, as shown, are duplicated on both sides of the main frame, but they and the associated mechanisms to be presently described act independently.

The front idler 14 is rotatably mounted on a stub axle 17 carried by and projecting outward from a bent lever 20, which lever at its rear end is rotatably mounted upon a stud 21 carried by a bracket 22 fixed to the main frame. From the pivot stud 21 this lever extends upward and forward at an angle substantially as shown to the point at which the stub axle 17 is secured. From this point this lever extends in a substantially vertical direction. The lever as shown is made with two spaced apart side bars, and these two side bars are connected about midway of its ends by a cross bar 23. In the construction shown this cross bar is tubular and the inner end of the stub axle 17 goes through and is rigidly secured in said cross bar. A leaf spring 19 is secured at its rear end to a bracket 11 fixed to the side frame member 10. The spring extends forward therefrom, passing between the two side bars of the lever 20 and engages and constantly bears down upon the cross bar 23. The effect of this spring is to swing the lever 20 downwardly and thereby carry the idler 14 forward so as to increase the distance between the axis of said idler and the axis of the sprocket 12, thereby taking up slack in the chain belt.

There is a roller-carrying frame 30 which is located below the upper reach of the track belt; and rollers 31 mounted on the frame engage and support the track belt. This frame 30, as shown, comprises two spaced apart side bars 30ᵃ. The rollers 31 of which there may be any desired number, lie between these two side bars and are rotatably supported upon cylindrical pins extending from one cross bar to the other. There are two levers 33, 34, which are pivoted at a suitable distance apart to the side frame member 10, and extend forwardly and upwardly at substantially the angle shown from said pivotal connections. At their upper ends these two levers 33, 34, are pivotally connected with the frame, 30.

A link 40 is pivoted to the upper extension of the lever 20 and to the lever 34 at a suitable point between the ends of the latter. This link 40 is of automatically variable length, being composed of two telescoping parts 41, 42, and a spring 43 which normally holds the parts in the distended position and yieldingly resists the shortening of the link, but nevertheless permits the link to shorten when an extraordinary strain is put upon it.

In the particular construction shown the part 41 telescopes into the part 42. A collar 41ª on the inner end of the part 41 is provided for engagement with the internal annular shoulder 42ª on the part 42 to limit the extension of the link.

The coiled spring 43 surrounds the two members 41, 42, and is compressed between a collar 43 which screws onto the part 42 and a collar 45 on the part 41. This spring by thrusting against these collars causes the engagement of the collar 41ª with the shoulder 42.

It should be understood that this specific construction of the link is not material. In fact, the primary invention does not require that the link be of automatic variable length. The latter characteristics are, however, distinct practical advantage, and are therefore desirable, and the specific construction shown and described is a thoroughly practical construction for the purpose.

The described mechanism operates under different conditions as follows:

When, as the vehicle is moving forward, the front part of the track belt comes into contact with a rock or log or some decided elevation in the ground, the front idler will swing upward and rearward, and the incidental shock will be largely absorbed by the spring 19. This will slacken the track belt. Under these conditions the frame 30 will be moved upwardly because of the swinging movement of the lever 20; and in its upward movement the frame 30 will take up the slack in and properly support the upper reach of the track belt. Under these conditions the link 40 will not be substantially shortened because the tension on the spring which is a part of this link is such that it will effectually resist the tendency to be shortened when no greater strain is applied to it than is involved in swinging the frame 30 upward as stated.

But in case the pockets in the links get full of mud or the like, or in case a stone or a piece of wood or anything else gets between the track and the sprocket or between the track and the idler, or anything else happens which tends to lengthen the path which the track belt must follow, the front idler automatically swings in opposition to the spring 19 into a compensating position. Under these conditions no slackness is put into the track belt and therefore it is not desirable, and generally it is not even possible for the frame 30 to swing upward. Under such conditions the spring 43 of the link 40 yields and permits the link to automatically shorten as much as is necessary under the circumstances.

It is obvious that numerous changes may be made in the specific embodiment of the invention shown without departure from the invention, providing means stated in any of the following claims or the equivalents of such stated means be employed.

Having described our invention, we claim:—

1. In a track laying vehicle, the combination with a main frame, an endless track belt, a sprocket wheel rotatably supported by the main frame within the rear end loop of the track belt, a front track wheel located within the front loop of the track belt, a lever pivoted to the main frame and extending upward and forward from its pivot and having in front of its pivot an axle on which the front track wheel is rotatably mounted, and a spring engaging said lever acting to swing the free end thereof downward.

2. In a track laying vehicle, the combination with a main frame, an endless track belt, a driving sprocket rotatably supported by the main frame within the rear end loop of the track belt, a front track wheel located within the front loop of the track belt, a lever pivoted to the main frame and extending upward and forward from its pivot and having in front of its pivot an axle on which the front track wheel is rotatably mounted, and a leaf spring secured at its rear end to the main frame and engaging said lever and acting to swing the free end thereof downward.

3. In a track laying vehicle, the combination with a main frame, an endless track belt, a sprocket wheel rotatably supported by the main frame within the rear loop of the track belt, a front track wheel located within the front loop of the track belt, a lever pivoted to the main frame and extended upward and forward from its pivot and having in front of its pivot an axle on which the front track wheel is rotatably supported, a spring engaging said lever acting to swing the free end thereof downward, a track supporting frame located below the upper reach of the track belt, one or more rollers mounted on said frame for engagement with the upper reach of said track belt, two levers which are pivotally connected with the main frame and with said track supporting frame, and a link connecting one of said levers with the lever in which the track wheel is supported.

4. In a track laying vehicle, the combination with a main frame, an endless track belt, a sprocket wheel rotatably supported by the main frame within the rear loop of the track belt, a front track wheel located within the front loop of the track belt, a lever pivoted to the main frame and extended upward and forward from its pivot and having in front of its pivot an axle on which the front track wheel is rotatably supported, a spring engaging said lever acting to swing the free end thereof downward, a track supporting frame located below the upper reach of the track belt, one or more rollers mounted on said frame for engagement with the upper reach of said track belt, two levers which are pivotally connected with the main frame and with said track supporting frame, and a link connecting one of said levers with the lever in which the track wheel is supported, said link consisting of two parts which are movable endwise relatively to each other, and a spring yieldingly resisting that endwise movement of said parts which will shorten the link.

In testimony whereof, we hereunto affix our signatures.

GORDON R. PENNINGTON.
SAMUEL K. WELLMAN.